US012118805B2

(12) United States Patent
Shen et al.

(10) Patent No.: US 12,118,805 B2
(45) Date of Patent: Oct. 15, 2024

(54) METHOD AND APPARATUS FOR DETECTING CORNER POINTS OF LANE LINES, ELECTRONIC DEVICE AND STORAGE MEDIUM

(71) Applicant: Beijing Tusen Zhitu Technology Co., Ltd., Beijing (CN)

(72) Inventors: Zhenwei Shen, Beijing (CN); Zehao Huang, Beijing (CN); Naiyan Wang, Beijing (CN)

(73) Assignee: BEIJING TUSEN ZHITU TECHNOLOGY CO., LTD., Beijing (CN)

( * ) Notice: Subject to any disclaimer, the term of this patent is extended or adjusted under 35 U.S.C. 154(b) by 424 days.

(21) Appl. No.: 17/652,256

(22) Filed: Feb. 23, 2022

(65) Prior Publication Data

US 2022/0270377 A1 Aug. 25, 2022

(30) Foreign Application Priority Data

Feb. 23, 2021 (CN) .......................... 202110202957.4

(51) Int. Cl.
*G06K 9/00* (2022.01)
*G06V 10/44* (2022.01)
(Continued)

(52) U.S. Cl.
CPC .......... *G06V 20/588* (2022.01); *G06V 10/443* (2022.01); *G06V 10/774* (2022.01); *G06V 10/82* (2022.01)

(58) Field of Classification Search
CPC .... G06V 20/588; G06V 10/443; G06V 10/82; G06V 10/774
See application file for complete search history.

(56) References Cited

U.S. PATENT DOCUMENTS

2020/0020102 A1* 1/2020 Dai ........................... G06N 3/04
2020/0341466 A1* 10/2020 Pham ..................... G06N 3/045
(Continued)

FOREIGN PATENT DOCUMENTS

CN 108898638 A 11/2018
CN 109583393 A 4/2019
(Continued)

OTHER PUBLICATIONS

European Patent Office, Extended European Search Report for EP 22157714, Mailing Date: Jul. 7, 2022, 8 pages.

*Primary Examiner* — Avinash Yentrapati
(74) *Attorney, Agent, or Firm* — Perkins Coie LLP

(57) ABSTRACT

The present application relates to a method and an apparatus for detecting corner points of a lane line, an electronic device and a storage medium. The method comprises: obtaining a road image to be detected; inputting the road image into a pre-trained neural network model to obtain a heat map prediction result, wherein the heat map prediction result comprises a probability of each pixel belonging to a specific corner point category; determining a plurality of different categories of corner points in the road image according to the probability of each pixel belonging to a specific corner point category in the heat map prediction result; and grouping the plurality of different categories of corner points according to a predetermined rule to obtain at least one corner point group. The present application can solve the problem that the corner points of the lane lines cannot be accurately and quickly detected.

20 Claims, 3 Drawing Sheets

(51) Int. Cl.
    *G06V 10/774*      (2022.01)
    *G06V 10/82*      (2022.01)
    *G06V 20/56*      (2022.01)

(56) References Cited

U.S. PATENT DOCUMENTS

| | | | | |
|---|---|---|---|---|
| 2021/0034856 | A1* | 2/2021 | Torres | G06V 30/414 |
| 2023/0273029 | A1* | 8/2023 | Filimonov | G06V 20/56 |
| | | | | 701/468 |

FOREIGN PATENT DOCUMENTS

| | | |
|---|---|---|
| CN | 111599007 A | 8/2020 |
| CN | 112053407 A | 12/2020 |

* cited by examiner

METHOD AND APPARATUS FOR DETECTING CORNER POINTS OF LANE LINES, ELECTRONIC DEVICE AND STORAGE MEDIUM

CROSS-REFERENCE TO RELATED APPLICATIONS

The present disclosure claims priority to Chinese Patent Application No. 202110202957.4, titled "METHOD AND APPARATUS FOR DETECTING CORNER POINTS OF LANE LINES, ELECTRONIC DEVICE AND STORAGE MEDIUM", filed on Feb. 23, 2021, the content of which is incorporated herein by reference in its entirety.

TECHNICAL FIELD

The present application belongs to the technical field of autonomous driving, and particularly relates to a method and an apparatus for detecting corner points of lane lines, an electronic device and a storage medium.

BACKGROUND

With the development of vehicles, more and more artificial intelligence technologies are applied to autonomous driving technology, and lane line detection is an important link in the autonomous driving technology.

The current lane line detection algorithm can adopt Canny edge detection algorithm to detect edges of lane lines, then utilizes Hough line transform to detect potential lines in an image, and then finds lane lines through some geometric limitations of lanes. In addition, a lane line detection method based on deep learning is available, such as adopting a semantic segmentation method to identify lane lines. However, these methods can only identify lane line pixels in the image, and cannot accurately and quickly detect corner points of lane lines.

SUMMARY

Various implementations of the disclosed technology provide a method and an apparatus for detecting corner points of lane lines, an electronic device and a storage medium. The implementations of the disclosed technology can provide more accurate and quicker detection of corner points as compared to the existing lane line detection.

The embodiments of the present application are realized as follows:

In a first aspect, an embodiment of the present application provides a method for detecting corner points of lane lines comprising: obtaining a road image to be detected; inputting the road image into a pre-trained neural network model to obtain a heat map prediction result corresponding to the road image, wherein the heat map prediction result comprises a probability of each pixel belonging to a specific corner point category (i.e., a probability that each pixel in the road image belongs to a specific corner point category); determining a plurality of different categories of corner points in the road image according to the probability of each pixel belonging to a specific corner point category in the heat map prediction result; and grouping the plurality of different categories of corner points according to a predetermined rule to obtain at least one corner point group. In an embodiment of the present application, the heat maps corresponding to the lane lines in the road image are predicted by using the neural network model, so that the probability of each pixel belonging to a specific corner point category in the heat map prediction result can be quickly obtained, then a plurality of different categories of corner points in the road image are determined according to the probability of each pixel belonging to a specific corner point category in the heat map prediction result, and then a plurality of corner point groups can be quickly obtained by grouping the plurality of different categories of corner points, so that the problem that the existing lane line detection method cannot accurately and quickly detect corner points of lane lines is solved. The predetermined rule comprises the corner point category and corner point location.

In one possible embodiment with reference to the embodiment in the first aspect, the neural network model comprises a first network branch and a second network branch, wherein the first network branch is configured for outputting a semantic segmentation result indicating whether each pixel in the road image belonging to lane lines or not, and the second network branch is configured for outputting a heat map prediction result of the road image. In an embodiment of the present application, a neural network model comprising two network branches is adopted, so that only one network can simultaneously output a semantic segmentation result indicating whether each pixel in the road image belonging to lane lines or not and a heat map prediction result of the road image, so as to remove points of an area without lane lines in the heat map based on the semantic segmentation result, which improves the accuracy of corner point detection; in addition, only one neural network model is involved, which saves use cost.

In one possible embodiment with reference to the embodiment in the first aspect, a prediction value of each pixel in the semantic segmentation result is 0 or 1, or the prediction value of each pixel in the semantic segmentation result is a probability value in a [0,1] interval; and a prediction value of each pixel in the heat map prediction result is a probability value in a [0,1] interval. The [0,1] interval means $0 \leq$ probability value $\leq 1$.

In one possible embodiment with reference to the embodiment in the first aspect, the method further comprises: multiplying the heat map prediction result by a prediction value of each pixel in the semantic segmentation result to reduce the predicted probability value of corner points in an area without lane lines in the heat map prediction result, thereby obtaining an updated heat map prediction result. The accuracy of corner point detection can be improved by adopting the method.

In one possible embodiment with reference to the embodiment in the first aspect, the multiplying the heat map prediction result by the prediction value of each pixel in the semantic segmentation result comprises: expanding a pixel region characterizing lane lines in the semantic segmentation result; and multiplying the heat map prediction result by the prediction value of each pixel in the range-expanded (or updated) semantic segmentation result. In an embodiment of the present application, by expanding a pixel region characterizing lane lines in the semantic segmentation result, and then multiplying the heat map prediction result by the prediction value of each pixel in the range-expanded (or updated) semantic segmentation result, the corner points which are close to the lane lines but have smaller prediction values of the semantic segmentation result are prevented from being missed in a corner point screening process.

In one possible embodiment with reference to the embodiment in the first aspect, the heat map prediction result comprises four heat maps, each heat map corresponding to a corner point category and comprising a probability of each pixel belonging to the corresponding corner point category in the heat map. In an embodiment of the present application, when a neural network model is configured for predicting the corner point category to which each pixel in the heat map belongs, each corner point is classified through the model, and four classified heat maps corresponding to 4 categories of corner points are directly outputted, so that the subsequent corner point matching precision is improved.

In one possible embodiment with reference to the embodiment in the first aspect, the determining a plurality of different categories of corner points in the road image according to the probability of each pixel belonging to a specific corner point category in the heat map prediction result comprises: determining corresponding category of corner points of each heat map according to a probability of each pixel belonging to a specific corner point category in the heat map, and further obtaining four categories of corner points contained in the four heat maps. In an embodiment of the present application, corresponding category of corner points of each heat map are determined according to a probability of each pixel belonging to a specific corner point category in the heat map, so that four categories of corner points contained in the four heat maps can be rapidly determined.

In one possible embodiment with reference to the embodiment in the first aspect, the determining corresponding category of corner points of each heat map according to a probability of each pixel belonging to a specific corner point category in the heat map comprises: adopting a preset sliding window area to perform a sliding window operation in the heat map, and annotating a central point of the sliding window area as a corresponding category of corner point if a probability value of the central point of the sliding window area meets a predetermined condition. In an embodiment of the present application, a preset sliding window area is adopted to perform a sliding window operation in the heat map, and a central point of the sliding window area with a probability value meeting a predetermined condition as a corresponding category of corner point; the confirmation speed of the corner point can be accelerated through the sliding window operation, and meanwhile, the central point of the sliding window area with the probability value meeting the predetermined condition is annotated as the corner point, so that the detection accuracy of the corner point can be improved.

In one possible embodiment with reference to the embodiment in the first aspect, the predetermined condition is that the probability value of the central point of the sliding window area is greater than or equal to a preset probability threshold value and is a local maximum value of the sliding window area. In an embodiment of the present application, only when the probability value of the central point of the sliding window area is greater than or equal to a preset probability threshold value and is a local maximum value of the sliding window area, the central point is annotated as the corner point, ensuring the detection accuracy of the corner point.

In one possible embodiment with reference to the embodiment in the first aspect, corner point categories comprise at least one of an upper-left category, an upper-right category, a lower-left category, and a lower-right category.

In one possible embodiment with reference to the embodiment in the first aspect, the grouping the plurality of different categories of corner points according to a predetermined rule to obtain at least one corner point group comprises: matching a corner point with an upper-left category and a corner point with an upper-right category which are closest to each other to obtain an upper corner point pair; matching a corner point with a lower-left category and a corner point with a lower-right category which are closest to each other to obtain a lower corner point pair; and matching the upper corner point pair and the lower corner point pair which are closest to each other to obtain a corner point group. In an embodiment of the present application, when different categories of corner points are grouped, a corner point with an upper-left category and a corner point with an upper-right category which are closest to each other are matched to obtain an upper corner point pair, a corner point with a lower-left category and a corner point with a lower-right category which are closest to each other are matched to obtain a lower corner point pair; and finally the upper corner point pair and the lower corner point pair which are closest to each other are matched to obtain a corner point group, and because the matching is performed based on the closest distance, each corner point group is ensured to contain 4 categories of corner points belonging to the same lane line to a certain extent.

In one possible embodiment with reference to the embodiment in the first aspect, the grouping the plurality of different categories of corner points according to a predetermined rule to obtain at least one corner point group comprises: matching a corner point with an upper-left category and a corner point with a lower-left category which are closest to each other to obtain a left corner point pair; matching a corner point with an upper-right category and a corner point with a lower-right category which are closest to each other to obtain a right corner point pair; and matching the left corner point pair and the right corner point pair which are closest to each other to obtain a corner point group. In an embodiment of the present application, when different categories of corner points are grouped, a corner point with an upper-left category of corner points and a corner point with a lower-left category which are closest to each other are matched to obtain a left corner point pair, a corner point with an upper-right category and a corner point with a lower-right category which are closest to each other are matched to obtain a right corner point pair; and then the left corner point pair and the right corner point pair which are closest to each other are matched to obtain a corner point group, and because the matching is performed based on the closest distance, each corner point group is ensured to contain 4 categories of corner points belonging to the same lane line to a certain extent.

In one possible embodiment with reference to the embodiment in the first aspect, after obtaining the plurality of corner point groups, the method further comprises: removing abnormal corner point groups from the plurality of corner point groups. In an embodiment of the present application, only normal corner point groups are reserved by removing the abnormal corner point groups from the plurality of corner point groups, so that the accuracy of corner point detection is improved.

In one possible embodiment with reference to the embodiment in the first aspect, the removing abnormal corner point groups from the plurality of corner point groups comprises: removing the corner point groups with the difference between edge lengths of two corner point pairs being greater than a predetermined threshold value from the plurality of the corner point groups. In an embodiment of the present application, the difference between edge lengths of two corner point pairs in the corner point group is compared with a predetermined threshold value, so that the abnormal corner point groups can be quickly removed.

In one possible embodiment with reference to the embodiment in the first aspect, the method further comprises: obtaining a plurality of training images containing dashed lane lines, wherein the training images are annotated with corner points of the dashed lane lines and a probability of each pixel near the corner points belonging to a specific corner point category; and training an initial neural network model by using the training image to obtain the trained neural network model. In an embodiment of the present application, the initial neural network model is trained by using the training images annotated with corner points of dashed lane lines and a probability of each pixel near the corner points belonging to a specific corner point category, so that a heat map capable of predicting a probability of each pixel in the lane lines belonging to a specific corner point category can be obtained, providing support for subsequent corner point detection.

In one possible embodiment with reference to the embodiment in the first aspect, the probability of each pixel near the corner point belonging to a specific corner point category presents a Gaussian distribution, and each corner point group constitutes one example of lane lines. In an embodiment of the present application, the annotation is performed according to the features that the probability of each pixel near the corner point belonging to a specific corner point category presents a Gaussian distribution, so that the precision of subsequent corner point detection is ensured.

In a second aspect, an embodiment of the present application further provides an apparatus for detecting corner points of lane lines comprising: an image obtaining module, a model prediction module, a corner point determination module and a corner point group determination module; the image obtaining module configured for obtaining a road image to be detected; the model prediction module configured for inputting the road image into a pre-trained neural network model to obtain a heat map prediction result corresponding to the road image, wherein the heat map prediction result comprises a probability of each pixel belonging to a specific corner point category; the corner point determination module configured for determining a plurality of different categories of corner points in the road image according to the probability of each pixel belonging to a specific corner point category in the heat map prediction result; and the corner point group determination module configured for grouping the plurality of different categories of corner points according to a predetermined rule.

In a third aspect, an embodiment of the present application further provides an electronic device comprising: a memory and a processor, wherein the processor is connected with the memory; the memory is configured for storing programs; the processor is configured for calling programs stored in the memory to perform the method provided by the embodiment in the first aspect described above and/or provided in any one possible embodiment with reference to the embodiment in the first aspect.

In a fourth aspect, an embodiment of the present application further provides a storage medium having a computer program stored thereon, wherein the computer program, when executed by a processor, performs the method provided by the embodiment in the first aspect described above and/or provided in any one possible embodiment with reference to the embodiment in the first aspect.

Additional features and advantages of the present application will be described in the following specification, and partially will be obvious from the specification, or may be comprehended by embodiments of the present application. The objectives and other advantages of the present application may be realized and attained by the structure particularly pointed out in the written specification and drawings.

BRIEF DESCRIPTION OF THE DRAWINGS

In order to more clearly illustrate embodiments of the present application or the technical schemes in the prior art, the drawings required for use in the embodiments will be briefly described below. It is obvious that the drawings in the description below are only some embodiments of the present application, and other drawings can be derived from these drawings by those of ordinary skilled in the art without making creative efforts. The above description and other objectives, features and advantages of the present application will be more apparent from the drawings. Identical reference numerals refer to the identical parts throughout all the drawings. The drawings are not intentionally scaled in equal proportion according to the actual size, but the emphasis thereof is to illustrate the principles of the present application.

DETAILED DESCRIPTION

The technical schemes in embodiments of the present application will be described below with reference to the drawings in the embodiments of the present application.

It should be noted that similar reference numbers and letters refer to similar terms in the following drawings, and thus, once a term is defined in one drawing, it is unnecessary to be further defined or explained in subsequent drawings. Meanwhile, relational terms such as "first", "second", and the like in the description of the present application may be used merely to distinguish an entity or operation from another entity or operation without necessarily requiring or implying that there is any such actual relationship or order between these entities or operations. Also, the terms "comprises", "comprising", or any other variation thereof are intended to cover a non-exclusive inclusion, such that a process, method, article, or apparatus that comprises a list of elements does not include only those elements but further include other elements not expressly listed or inherent to such process, method, article, or apparatus. An element defined by the phrase "comprising a . . . " does not, without more constraints, preclude the existence of additional identical elements in the process, method, article, or apparatus that comprises the element.

Furthermore, the term "and/or" in the present application is merely an associative relationship describing the associated objects, and means that there may be three relationships. For example, A and/or B could mean: there is A alone, there are both A and B, and there is B alone.

In view of the problem that the existing lane line detection method cannot accurately and quickly detect corner points of lane lines, an embodiment of the present application provide method for detecting corner points of lane lines. The heat maps (also called response maps) corresponding to the lane lines in the road image are predicted by using the neural network model, so that the probability (also called response value or confidence) of each pixel belonging to a specific corner point category in the heat map prediction result (also called response map prediction result) can be quickly obtained, then a plurality of different categories of corner points in the road image are determined according to the probability of each pixel belonging to a specific corner point category in the heat map prediction result, and then a plurality of corner point groups can be quickly obtained by grouping the plurality of different categories of corner points, so that the problem that the existing lane line detection method cannot accurately and quickly detect corner points of lane lines is solved.

Figure 1:
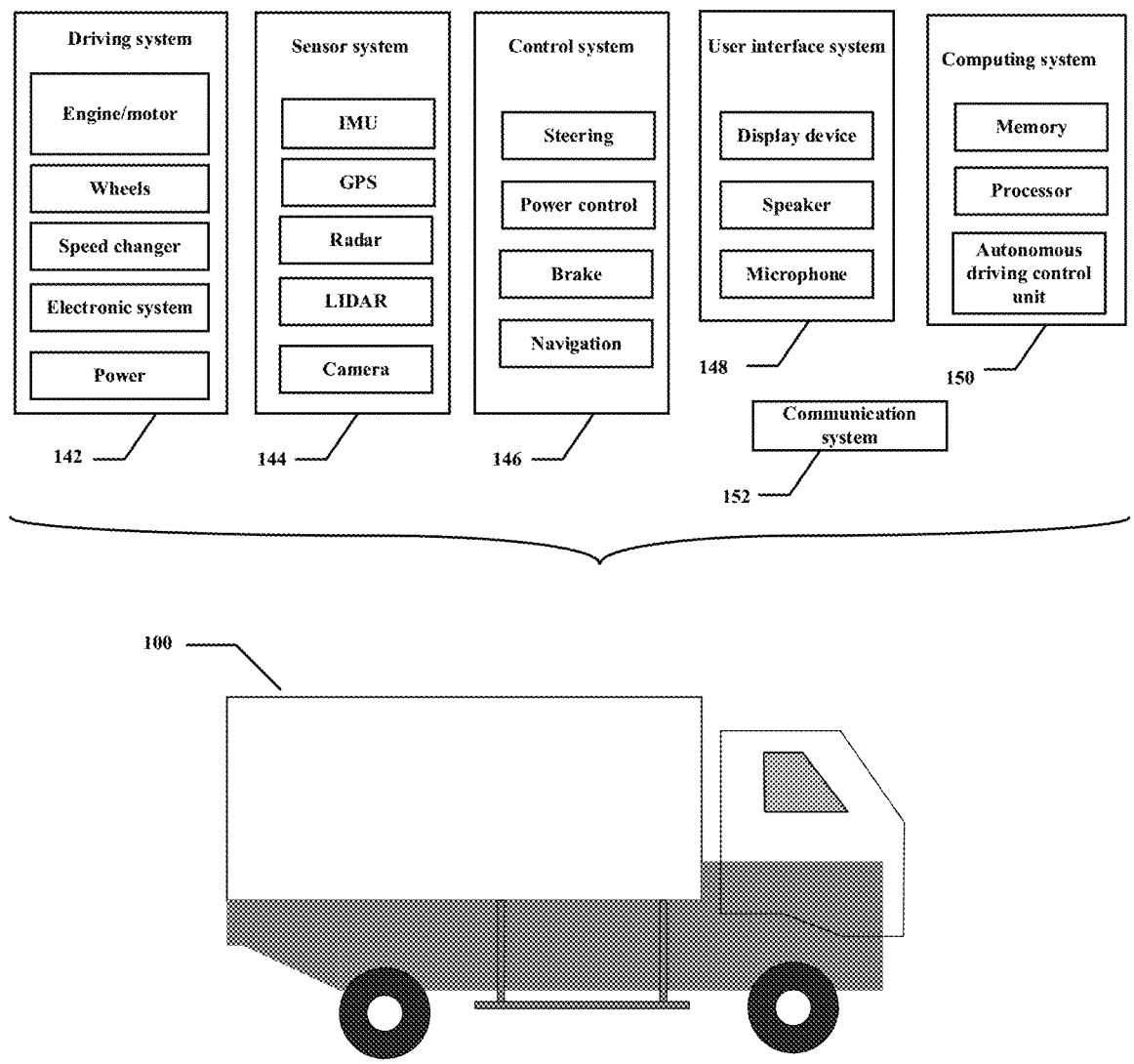
FIG. 1 is a schematic diagram of the architecture of a vehicle provided in an embodiment of the present application.

The method for detecting corner points of lane lines provided in the embodiment of the present application can be applied to a vehicle, and the vehicle related to the present application will be described below with reference to FIG. 1. FIG. 1 is a schematic diagram of a vehicle 100 in which various techniques disclosed herein are implemented. The vehicle 100 may be a car, a truck, a motorcycle, a bus, a watercraft, an airplane, a helicopter, a hay mower, an excavator, a snowmobile, an aircraft, a recreational vehicle, an amusement park vehicle, a farm equipment, a construction equipment, a tram, a golf cart, a train, a trolley bus or other vehicles. The vehicle 100 can be operated fully or partially in an autonomous driving mode. The vehicle 100 can control itself in the autonomous driving mode. For example, the vehicle 100 can determine a current state of the vehicle and a current state of an environment in which the vehicle is located, determine a predicted behavior of at least one other vehicle in this environment, and determine a trust level corresponding to a likelihood that the at least one other vehicle performs the predicted behavior, and thus the vehicle 100 can control itself based on these determined information. The vehicle 100, when in the autonomous driving mode, can be operated without human interaction.

The vehicle 100 may comprise various vehicle systems, such as a driving system 142, a sensor system 144, a control system 146, a user interface system 148, a computing system 150, and a communication system 152. The vehicle 100 may comprise more or fewer systems, each of which may comprise a plurality of units. Further, each system and unit of the vehicle 100 can be interconnected. For example, the computing system 150 can be in data communication with one or more of the driving system 142, the sensor system 144, the control system 146, the user interface system 148 and the communication system 152. Thus, one or more of the described functions of the vehicle 100 may be divided into additional functional or physical components or combined into a fewer number of functional or physical components. In a still further example, additional functional or physical components may be added to the example shown in FIG. 1. The driving system 142 may comprise a plurality of operable components (or units) that provide kinetic energy for the vehicle 100. In an embodiment, the driving system 142 may comprise an engine or a motor, wheels, a speed changer, an electronic system, and power (or a power source). The engine or motor may be any combination of the following apparatuses: an internal combustion engine, an electrical machine, a steam engine, a fuel cell engine, a propane engine or other forms of engines or motors. In some embodiments, the engine may convert a source of power into mechanical energy. In some embodiments, the driving system 142 may comprise a variety of engines or motors. For example, a hybrid electric vehicle may comprise a gasoline engine and a motor, and may also comprise other combinations.

The wheels of the vehicle 100 may be standard wheels. The wheels of the vehicle 100 may be in a variety of forms including single wheel, dual wheel, three wheel or four wheel forms, such as four wheels on a car or a truck. Other numbers of wheels are possible, such as six or more wheels. One or more wheels of the vehicle 100 may be operated to rotate in a direction different from the other wheels. The wheel may be at least one wheel fixedly connected with the speed changer. The wheel may comprise a combination of metal and rubber or a combination of other substances. The speed changer may comprise a unit operable to transmit mechanical power of the engine to the wheels. For this purpose, the speed changer may comprise a gearbox, a clutch, a differential gear and a propeller shaft. The speed changer may also comprise other units. The propeller shaft may comprise one or more axles that mate with the wheels. The electronic system may comprise a unit for transmitting or controlling electronic signals of the vehicle 100. These electronic signals can be used to activate a plurality of lights, servos, motors and other electronically driven or controlled apparatuses in the vehicle 100. The power source may be an energy source that wholly or partially powers an engine or a motor. That is, the engine or the motor can convert the power source into mechanical energy. For example, the power source may include gasoline, petroleum, petroleum-based fuels, propane, other compressed gas fuels, ethanol, fuel cells, solar panels, batteries and other sources of electrical energy. The power source may additionally or optionally comprise any combination of a fuel tank, a battery, a capacitor or a flywheel. The power source may also provide power to other systems of the vehicle 100.

The sensor system 144 may comprise a plurality of sensors for sensing information about the environment and conditions of the vehicle 100. For example, the sensor system 144 may comprise an Inertial Measurement Unit (IMU), a GNSS (Global Navigation Satellite System) transceiver (e.g., a Global Positioning System (GPS) transceiver), a radar (RADAR), a laser rangefinder/LIDAR (or other distance measurement apparatuses), an acoustic sensor, an ultrasonic sensor and a camera or an image capture apparatus. The sensor system 144 may comprise a plurality of sensors (e.g., oxygen ($O_2$) monitors, fuel gauge sensors, engine oil pressure sensors, temperature sensors, humidity sensors, and pressure sensors) configured for monitoring the vehicle 100. Other sensors may also be configured. One or more sensors comprised in the sensor system 144 can be driven independently or collectively to update the position, orientation, or both of the one or more sensors.

The IMU may comprise a combination of sensors (e.g., an accelerometer and a gyroscope) for sensing position and direction changes of the vehicle 100 based on inertial acceleration. The GPS transceiver may be any sensor for estimating the geographic location of the vehicle 100. For this purpose, the GPS transceiver may comprise a receiver/a transmitter to provide positional information of the vehicle 100 relative to the earth. It should be noted that GPS is an example of a global navigation satellite system, and therefore, in some embodiments, the GPS transceiver may be replaced with a BeiDou satellite navigation system transceiver or a Galileo satellite navigation system transceiver. The radar unit may use radio signals to sense objects in the environment in which the vehicle 100 is located. In some embodiments, in addition to sensing objects, the radar unit may also be used to sense the speed and heading of an object approaching the vehicle 100. The laser rangefinder or LIDAR unit (or other distance measurement apparatuses) may be any sensor that uses a laser to sense objects in the environment in which the vehicle 100 is located. In one embodiment, the laser rangefinder/LIDAR unit may comprise a laser source, a laser scanner and a detector. The laser rangefinder/LIDAR unit is configured for operating in either a continuous (e.g., using heterodyne detection) or discontinuous detection mode. The camera may comprise apparatuses for capturing multiple images of the environment in which the vehicle 100 is located. The camera may be a still image camera or a motion video camera.

The control system 146 is configured for controlling the operation of the vehicle 100 and components (or units) thereof. Accordingly, the control system 146 may comprise various units, such as a steering unit, a power control unit, a brake unit, and a navigation unit.

The steering unit may be a combination of machines that adjust the heading of the vehicle 100. The power control unit (which may be, e.g., an accelerator) may be, for example, used to control the operating speed of the engine and thereby the speed of the vehicle 100. The brake unit may comprise a combination of machines for decelerating the vehicle 100. The brake unit may use friction to decelerate the vehicle in a standard manner. In other embodiments, the brake unit may convert kinetic energy of the wheel into electric current. The brake unit may be in other forms as well. The navigation unit may be any system that determines a driving path or route for the vehicle 100. The navigation unit may also dynamically update the driving path as the vehicle 100 proceeds. The control system 146 may additionally or optionally comprise other components (or units) not shown or described.

The user interface system 148 can be configured for allowing the interaction between the vehicle 100 and external sensors, other vehicles, other computer systems, and/or users of the vehicle 100. For example, the user interface system 148 may comprise a standard visual display device (e.g., a plasma display, a liquid crystal display (LCD), a touch screen display, a head-mounted display, or other similar display), a speaker or other audio output devices, a microphone, or other audio input devices. For example, the user interface system 148 may also comprise a navigation interface and an interface to control the internal environment (e.g., temperature or fans) of the vehicle 100.

The communication system 152 may provide the vehicle 100 with a way to communicate with one or more devices or other vehicles in the vicinity. In one exemplary embodiment, the communication system 152 may communicate with one or more devices directly or through a communication network. The communication system 152 may be, for example, a wireless communication system. For example, the communication system may use 3G cellular communication (e.g., CDMA, EVDO or GSM/GPRS) or 4G cellular communication (e.g., WiMAX or LTE), and may also use 5G cellular communication. Optionally, the communication system may communicate with a Wireless Local Area Network (WLAN) (e.g., using WIFI®). In some embodiments, the communication system 152 may communicate directly with one or more devices or other vehicles around, for example, using infrared, Bluetooth® or ZIGBEE. Other wireless protocols, such as various in-vehicle communication systems, are also within the scope of the present application. For example, the communication systems may include one or more Dedicated Short Range Communication (DSRC) apparatuses, V2V apparatuses or V2X apparatuses that may be in data communication publicly or privately with vehicles and/or roadside stations.

The computing system 150 can control some or all of the functions of the vehicle 100. An autonomous driving control unit of the computing system 150 can be configured for identifying, evaluating, and avoiding or removing potential obstacles in the environment in which the vehicle 100 is located. In general, the autonomous driving control unit can be configured for controlling the vehicle 100 in the absence of a driver or for providing assistance to the driver in controlling the vehicle. In some embodiments, the autonomous driving control unit is configured for combining data from a GPS transceiver, a radar, a LIDAR, a camera and other vehicle systems to determine a travel path or trajectory of the vehicle 100. The autonomous driving control unit can be activated to enable the vehicle 100 to be driven in an autonomous driving mode.

The computing system 150 may comprise at least one processor (which may comprise at least one microprocessor) that executes processing instructions (i.e., machine-executable instructions) stored in a non-volatile computer readable medium (e.g., a data storage device or a memory). The computing system 150 may also be a plurality of computing apparatuses that distributively control components or systems of the vehicle 100. In some embodiments, the memory may contain processing instructions that are executed by the processor to implement various functions of the vehicle 100 (e.g., program logic). In an embodiment, the computing system 150 can perform data communication with the driving system 142, the sensor system 144, the control system 146, the user interface system 148, and/or the communication system 152. The interfaces of the computing system are configured for facilitating data communication between the computing system 150 and the driving system 142, the sensor system 144, the control system 146, the user interface system 148, and the communication system 152.

The memory may also comprise other instructions, including instructions for data transmission, data reception, interaction, or control of the driving system 142, the sensor system 144, the control system 146 or the user interface system 148.

In addition to storing processing instructions, the memory may store a variety of information or data, such as image processing parameters, road maps and path information. The information may be used by the vehicle 100 and the computing system 150 during operation of the vehicle 100 in an autonomous mode, a semi-autonomous mode and/or a manual mode.

Although the autonomous driving control unit is shown as separated from the processor and the memory, it should be understood that, in some embodiments, some or all of the functions of the autonomous driving control unit can be implemented using program code instructions residing in one or more processors (or data storage apparatuses) and can be executed by the one or more processors, and that the autonomous driving control unit can be implemented using the same processor and/or memory (or data storage apparatuses) in some cases. In some embodiments, the autonomous driving control unit may be implemented, at least in part, using various application-specific circuit logics, various processors, various Field Programmable Gate Arrays ("FPGAs"), various Application-Specific Integrated Circuits ("ASICs"), various real-time controllers and hardware.

The computing system 150 may control functions of the vehicle 100 based on inputs received from various vehicle systems (e.g., the driving system 142, the sensor system 144 and the control system 146) or inputs received from the user interface system 148. For example, the computing system 150 may use inputs from the control system 146 to control the steering unit to avoid obstacles detected by the sensor system 144. In an embodiment, the computing system 150 can be configured for controlling various aspects of the vehicle 100 and systems thereof.

Although various components (or units) integrated into the vehicle 100 are shown in FIG. 1, one or more of the components (or units) may be mounted on the vehicle 100 or separately associated with the vehicle 100. For example, the computing system may exist partially or wholly independent of the vehicle 100. Thus, the vehicle 100 can exist in the form of separate or integrated device units. The device units constituting the vehicle 100 can communicate with each other in wired or wireless communication. In some embodiments, additional components or units may be added to various systems, or one or more components or units above (e.g., the LiDAR or radar as shown in FIG. 1) may be removed from the systems.

Figure 2:
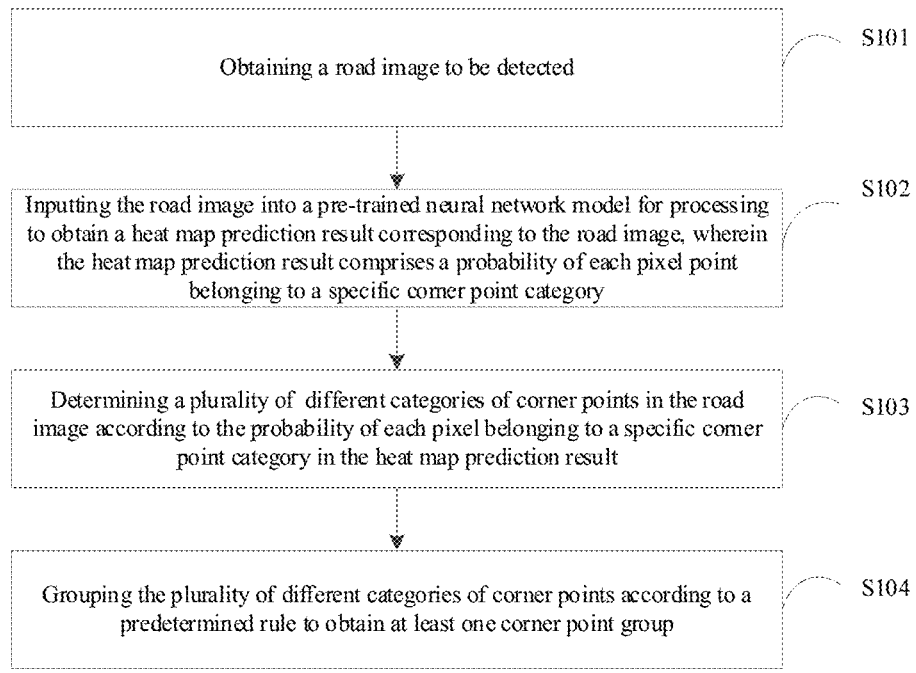
FIG. 2 is a schematic flowchart of the method for detecting corner points of lane lines provided in an embodiment of the present application.

After the vehicle architecture related to the present application is introduced, a method for detecting corner points of lane lines provided in an embodiment of the present application will be described below with reference to FIG. 2.

Step S101: a road image to be detected is obtained.

The road graphics of the vehicle during autonomous driving process can be acquired in real time through a camera installed on the vehicle to obtain the road image to be detected. The camera may be a front facing camera installed in front of the vehicle, a side facing camera installed at a side of the vehicle, or a hybrid mode camera of the front facing camera and the side facing camera.

Wherein, small squares in dashed lane lines in the road image acquired by the front facing camera are in a vertical rectangle form, and small squares in dashed lane lines in the road image acquired by the side facing camera are in a horizontal rectangle form.

Step S102: the road image is inputted into a pre-trained neural network model for processing to obtain a heat map prediction result corresponding to the road image, wherein the heat map prediction result comprises a probability of each pixel belonging to a specific corner point category.

The road images to be detected are inputted into a pre-trained neural network model for processing, so as a heat map prediction result (also called response map prediction result) corresponding to the road image can be obtained, wherein the heat map prediction result comprises a probability (also called response value or confidence) of each pixel belonging to a specific corner point category. The corner point category comprises an upper-left category, an upper-right category, a lower-left category or a lower-right category, and specific corner point categories to which different pixels belong can be different.

Wherein, the neural network model is trained in advance, and the training process thereof can be as follows: firstly, obtaining a plurality of (more than or equal to 2) training images containing dashed lane lines, and then training an initial neural network model by using the training images, so as to obtain the trained neural network model. Wherein, the training images are annotated with corner points of dashed lane lines and a probability (also called response value or confidence) of each pixel near the corner points belonging to a specific corner point category, that is, after the road image containing dashed lane lines is obtained, annotation is performed on corner points of dashed lane lines in the training images and a probability of each pixel near the corner points belonging to a specific corner point category by using an annotation algorithm, a probability of the pixel located at the corner point is 1, and a probability of each pixel near the corner points belonging to a specific corner point category is distributed regularly, that is, these probability values conform to specific function distributions, including but not limited to a Gaussian distribution. Generally, a probability value of the pixel farther from corner points is relatively smaller. The labels corresponding to different corner point categories are different, and the corner point categories comprise an upper-left category, an upper-right category, a lower-left category and a lower-right category. 4 categories of corner points belonging to the same dashed lane line constitute a corner point group, and each corner point group constitutes one example of lane lines. Wherein, the neural network model can be a Convolutional Neural Network (CNN). It should be noted that the term of "near" in the present application means a predetermined distance from a target point (such as a corner point).

Figure 3:
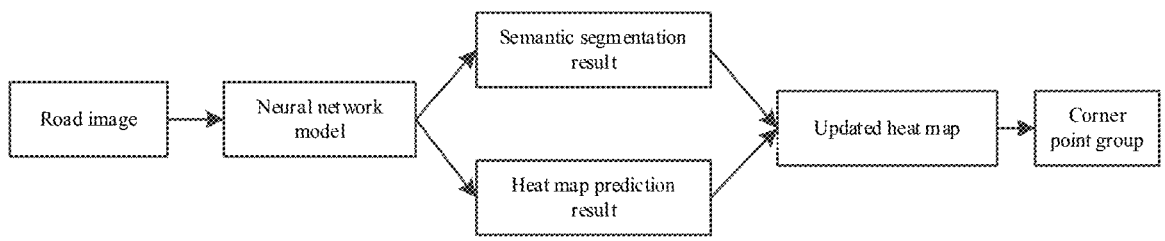
FIG. 3 is a schematic diagram of the principle of the method for detecting corner points of lane lines provided in an embodiment of the present application.

In an embodiment, a neural network model can comprise a first network branch and a second network branch, wherein the first network branch is configured for outputting a semantic segmentation result indicating whether each pixel in the road image belonging to lane lines or not, and the second network branch is configured for outputting a heat map prediction result of the road image. In such an embodiment, the road image is inputted into the neural network model, so that a semantic segmentation result indicating whether each pixel in the road image belonging to lane lines or not and a heat map prediction result of the road image are outputted, and the schematic diagram of the principle thereof is shown in FIG. 3. A prediction value of each pixel in the semantic segmentation result is 0 or 1, or the prediction value of each pixel in the semantic segmentation result is a probability value in a [0,1] interval. A prediction value of each pixel in the heat map prediction result is a probability value in a [0,1] interval. Certainly, those skilled in the art also can set other value ranges as desired as long as probability differences between each pixel can be characterized, which is not limited in the present application.

During training, common neural network optimization algorithms, such as Stochastic Gradient Descent (SGD), Adam and the like, may be adopted for optimizing training, and when a loss function is selected, common split loss functions, such as Softmax, Cross Entropy and the like, may be used for the first network branch. For the second network branch, loss functions commonly used for training a heat map, such as Focal Loss, Mean Square Error (MSE) and the like, may be used. The optimization algorithm and loss functions in the above example are well known to those skilled in the art, and will not be described herein.

It should be understood that the method for detecting lane lines may be performed during the operation of a real vehicle. The captured image during the operation may or may not comprise a road. Therefore, when a model is adopted for processing the image, whether there are lane lines in the image or not can be identified firstly (for example, the semantic segmentation result shows that each pixel is a background point), and if yes, the subsequent steps, such as the prediction of a heat map prediction result, are performed; if not, the detection of corner points of lane lines in a current image is stopped, and the detection of lane lines in the next image is continuously performed. Herein, whether there are lane lines in the current image or not may also be determined according to a priori information (e.g., target tracking result of the previous frame). In order to improve the accuracy of the detection of corner points of lane lines, in one embodiment, the heat map prediction result may be multiplied by the prediction value of each pixel in the semantic segmentation result to reduce the prediction value of corner points in the area without lane lines in the heat map, so as to obtain an updated heat map (see FIG. 3). Wherein, a prediction value of each pixel in the semantic segmentation result is 0 or 1, or the prediction value of each pixel in the semantic segmentation result is a probability value in a [0,1] interval. A prediction value of each pixel in the heat map prediction result is a probability value in a [0,1] interval. A probability value characterizing pixels of foreground (lane lines) in the semantic segmentation result is 1, and a probability value characterizing pixels that of background (not lane lines) is 0. With the heat map prediction result multiplied by the prediction value of each pixel in the semantic segmentation result, the predicted probability value of corner points in the area without lane lines in the heat map can be effectively reduced, and the accuracy of corner point detection can be improved. For example, if there is a lane line at a certain position, the heat map prediction result is multiplied by 1; if not, the heat map prediction result is multiplied by 0.

When the heat map prediction result is multiplied by the prediction value of each pixel in the semantic segmentation result, in one embodiment, the heat map prediction result may be directly multiplied by the prediction value of each pixel in the semantic segmentation result; in another optional embodiment, a pixel region characterizing lane lines in the semantic segmentation result may be expanded (including but not limited to expanding three pixels outwards), then the heat map prediction result is multiplied by the prediction value of each pixel in the large-expanded semantic segmentation result, so that it is ensured that part of the corner points of the area with lane lines are not filtered when the corner points of the area without lane lines in the heat map are filtered.

The present application expands the pixel region (also called pixel range) characterizing lane lines in the semantic segmentation result, and mainly aims to prevent the corner points which are close to lane lines but have smaller prediction results in the semantic segmentation (the prediction results of the corner points are positioned outside edges) from being missed in a corner point screening process. It should be noted that, when a semantic segmentation result is represented by binary classification (0 or 1), a pixel region characterizing lane lines in the semantic segmentation result can be directly expanded; when the semantic segmentation result is represented by a probability value of a [0,1] interval, the semantic segmentation result may not be expanded, or a certain threshold value (e.g., 0.5) may be set, after the probability value of the [0,1] interval is changed into a binary classification result, and the pixel region characterizing lane lines is expanded.

In one optional embodiment, the heat map prediction result comprises four heat maps, each heat map corresponds to a corner point category and comprises a probability of each pixel belonging to the corresponding corner point category in the heat map. In such an embodiment, the heat map prediction result comprises a heat map characterizing that a corner point belongs to an upper-left category, a heat map characterizing that a corner point belongs to an upper-right category, a heat map characterizing that a corner point belongs to a lower-left category, and a heat map characterizing that a corner point belongs to a lower-right category. In this situation, each pixel in the same heat map belongs to the same corner point category. A probability value of an area near each corner point conforms to a Gaussian distribution, the maximum probability value of the position of the corner point is 1, and the probability value becomes smaller correspondingly as the distance from the corner point becomes farther.

In an embodiment of the present application, when a neural network model is configured for predicting the corner point category to which each pixel in the heat map belongs, each corner is classified through the model, and four classified heat maps corresponding to 4 categories of corner points are directly outputted, so that the subsequent corner point matching precision is improved. Herein, mismatching can be reduced after the corner points are classified, for example, upper-left corner points only match upper-right corner points, and if the upper-right corner points are missed, no upper-right corner points are suitable for matching, so that mismatching cannot be caused.

In one optional embodiment, the four heat maps described above may be integrated on the same map. Then each pixel may have an array comprising four values, each value represents the possibility for the pixel belonging to a specific corner point category respectively.

Step S103: a plurality of different categories of corner points in the road image are determined according to the probability of each pixel belonging to a specific corner point category in the heat map prediction result.

After the heat map prediction result is obtained, the plurality of different categories of corner points in the road image can be determined according to the probability of each pixel belonging to a specific corner point category in the heat map prediction result, that is, the corner points belonging to an upper-left category, an upper-right category, a lower-left category and a lower-right category in the road images are determined.

In one optional embodiment, the heat map prediction result comprises four heat maps, and each heat map corresponds to a corner point category, and comprises a probability of each pixel in the heat map belonging to the corresponding corner point category. At this situation, the process of determining a plurality of different categories of corner points in the road image according to the probability of each pixel belonging to a specific corner point category in the heat map prediction result may comprise: determining corresponding category of corner points of each heat map according to a probability of each pixel belonging to a specific corner point category in the heat map, and further obtaining four categories of corner points contained in the four heat maps. For example, for a probability value of each pixel belonging to an upper-left category in the heat map, corner points belonging to the upper-left category is determined, for example, pixels with the maximum probability value in each sliding window area is selected as corner points.

Wherein, the process of determining corresponding category of corner points of each heat map according to a probability of each pixel belonging to a specific corner point category in the heat map may comprise: adopting a preset sliding window area to perform a sliding window operation in the heat map, and annotating a central point of the sliding window area as a corresponding category of corner point if a probability value of the central point of the sliding window area meets a predetermined condition. Wherein, the predetermined condition may comprise: the probability value of the central point of the sliding window area is greater than or equal to a preset probability threshold value (e.g., 0.7) and is a local maximum value of the sliding window area. Wherein, a size of the sliding window area may be selected according to actual needs, and the preset probability threshold value may also be determined according to actual situations (including but not limited to 0.7 in the above example), so that these cannot be construed as a limitation to the present application. For example, when the sliding window operation is performed in the heat map characterizing upper-left category of corner points, a central point of the sliding window area with the probability value meeting the predetermined condition may be annotated as an upper-left category of corner point.

Step S104: The plurality of different categories of corner points are grouped according to a predetermined rule to obtain at least one corner point group.

After determining the plurality of different categories of corner points in the road image, the plurality of different categories of corner points can be grouped according to the predetermined rule to obtain the plurality of corner point groups, wherein each corner point group comprises 4 categories (an upper-left category, an upper-right category, a lower-left category and a lower-right category) of corner points belonging to the same lane line.

Wherein, when the plurality of different categories of corner points are grouped according to the predetermined rule, in one optional embodiment, a corner point with an upper-left category and a corner point with an upper-right category which are closest to each other are matched to obtain an upper corner point pair, a corner point with a lower-left category and a corner point with a lower-right category which are closest to each other are matched to obtain a lower corner point pair, and then the upper corner point pair and the lower corner point pair which are closest to each other are matched to obtain a corner point group. When the matching is performed, a corner point with an upper-left category can be matched with the closest corner point with an upper-right category, or the a corner point with an upper-right category can also be matched with the closest corner point with an upper-left category; similarly, when a corner point with a lower-left category and a corner point with a lower-right category which are closest to each other are matched, the a corner point with a lower-left category can also be matched with the closest corner point with a lower-right category, or the a corner point with a lower-right category can also be matched with the closest corner point with a lower-left category; and similarly, when an upper corner point pair and a lower corner point pair closest to each other are matched, the upper corner point pair can be matched with the closest lower corner point pair, or the lower corner point pair can also be matched with the closest upper corner point pair.

In another optional embodiment, a corner point with an upper-left category and a corner point with an lower-left category closest to each other can be matched to obtain a left corner point pair, a corner point with an upper-right category and a corner point with a lower-right category closest to each other are matched to obtain a right corner point pair, and the left corner point pair and the right corner point pair closest to each other are matched to obtain a corner point group. When the matching is performed, a corner point with a upper-left category can be matched with the closest corner point with a lower-left category, or the a corner point with a lower-left category can also be matched with the closest corner point with an upper-left category; similarly, when a corner point with an upper-right category and a corner point with a lower-right category which are closest to each other are matched, the a corner point with an upper-right category can also be matched with the closest corner point with a lower-right category, or the a corner point with an lower-right category can also be matched with the closest corner point with an upper-right category; and similarly, when a left corner point pair and a right corner point pair which are closest to each other are matched, the left corner point pair can be matched with the closest right corner point pair, or the right corner point pair can also be matched with the closest left corner point pairs.

Wherein, the matching can be performed based on a short-edge matching principle, that is, for the road image acquired by the front facing camera (small squares representing dashed lane lines are in a vertical rectangular shape), when the matching is performed, preferably, a mode that the a corner point with an upper-left category and the a corner point with an upper-right category which are closest to each other are matched to obtain the upper corner point pair, the a corner point with a lower-left category and the a corner point with a lower-right category which are closest to each other are matched to obtain the lower corner point pair, and then the upper corner point pair and the lower corner point pair which are closest to each other are matched is adopted; for the road image acquired by the side-facing camera (small squares representing dashed lane lines are in a horizontal rectangle form), when the matching is performed, preferably, a mode that the a corner point with an upper-left category and the a corner point with a lower-left category which are closest to each other can be matched to obtain the left corner point pair, the corner points of upper-right category and the a corner point with a lower-right category which are closest to each other are matched to obtain the right corner point pair, and the left corner point pair and the right corner point pair which are closest to each other are matched is adopted.

In order to improve the accuracy of corner point detection, as one optional embodiment, after obtaining the plurality of corner point groups, the method further comprises: removing abnormal corner point groups from the plurality of corner point groups. The obviously abnormal corner point groups are removed from the obtained plurality of the corner point groups to improve the accuracy of the corner point detection.

According to the present application, the corner point matching is performed based on a closest-distance mode, which ensures that each corner point group contains 4 categories of corner points belonging to the same lane line to a certain extent. And then the abnormal corner point groups are removed, which further ensures that each corner point group contains the corner points of the 4 categories belonging to the same lane line and each corner point group forms an example of the lane line.

The removing the abnormal corner point groups from the plurality of corner point groups may remove the corner point groups with a difference between edge length of two corner point pairs greater than a predetermined threshold value from the plurality of the corner point groups. For each corner point group (comprising one upper-left corner point, one lower-left corner point, one upper-right corner point and one lower-right corner point), the corner point group is the abnormal corner point group if the difference between the edge length of the upper-left/upper-right corner point pair and the edge length of the lower-left/lower-right corner point pair is greater than a predetermined threshold value, or the difference between the edge length of the upper-right/lower-right corner point pair and the edge length of the upper-left/lower-left corner point pair is greater than the predetermined threshold value. Wherein, the predetermined threshold value can be set as desired.

In addition, the corner point groups without the lane line in the semantic segmentation result corresponding to an area where diagonal lines are located can be removed from the plurality of the corner point groups having the four corner points. That is, for each corner point group (comprising one upper-left corner point, one lower-left corner point, one upper-right corner point and one lower-right corner point), the corner point group can be removed if there is no lane line in the semantic segmentation result corresponding to an intersection of a line connecting the upper-left and lower-right corner points and a line connecting the lower-left and upper-right corner points.

Figure 4:
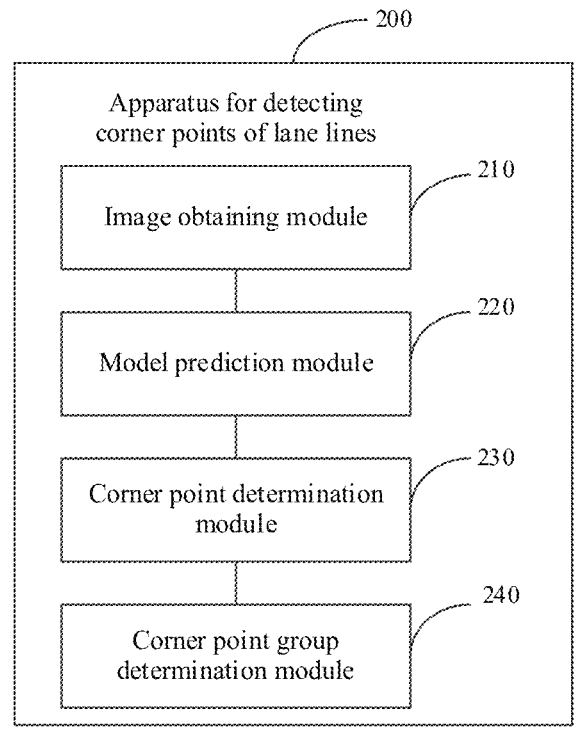
FIG. 4 is a block diagram of modules of the method for detecting corner points of lane lines provided in an embodiment of the present application.

An embodiment of the present application further provides an apparatus 200 for detecting corner points of lane lines, as shown in FIG. 4. The apparatus 200 for detecting corner points of lane lines comprises an image obtaining module 210, a model prediction module 220, a corner point determination module 230, and a corner point group determination module 240.

The image obtaining module 210 is configured for obtaining a road image to be detected.

The model prediction module 220 is configured for inputting the road image into a pre-trained neural network model for processing to obtain a heat map prediction result corresponding to the road image, wherein the heat map prediction result comprises a probability of each pixel belonging to a specific corner point category.

The corner point determination module 230 is configured for determining a plurality of different categories of corner points in the road image according to the probability of each pixel belonging to a specific corner point category in the heat map prediction result.

The corner point group determination module 240 is configured for grouping the plurality of different categories of corner points according to a predetermined rule.

Optionally, a neural network model comprises a first network branch and a second network branch, wherein the first network branch is configured for outputting a semantic segmentation result indicating whether each pixel in the road image belonging to lane lines or not, and the second network branch is configured for outputting a heat map prediction result of the road image. A prediction value of each pixel in the semantic segmentation result is 0 or 1, or the prediction value of each pixel in the semantic segmentation result is a probability value in a [0,1] interval; and a prediction value of each pixel in the heat map prediction result is a probability value in a [0,1] interval. Accordingly, the apparatus 200 for detecting corner points of lane lines further comprises: a heat map updating module (not shown in FIG. 4) configured for multiplying the heat map prediction result by the prediction value of each pixel in the semantic segmentation result to reduce the prediction value of corner points in the area without lane lines in the heat map, so as to obtain an updated heat map. Optionally, the heat map update module is specifically configured for expanding a pixel region characterizing lane lines in the semantic segmentation result, and multiplying the heat map prediction result by a prediction value of each pixel in the range-expanded semantic segmentation result.

Optionally, the heat map prediction result comprises four heat maps, each heat map corresponds to a corner point category and comprises a probability of each pixel belonging to the corresponding corner point category in the heat map. The corner point determination module 230 is specifically configured for: determining corresponding category of corner points of each heat map according to a probability of each pixel belonging to a specific corner point category in the heat map, and further obtaining four categories of corner points contained in the four heat maps. The corner point determination module 230 is specifically configured for: adopting a preset sliding window area to perform a sliding window operation in the heat map, and annotating a central point of the sliding window area as a corresponding category of corner point if a probability value of the central point of the sliding window area meets a predetermined condition. Optionally, the predetermined condition is that the probability value of the central point of the sliding window area is greater than or equal to a preset probability threshold value and is a local maximum value of the sliding window area.

Wherein, corner point categories comprise at least one of an upper-left category, an upper-right category, a lower-left category, and a lower-right category.

Optionally, the corner point group determination module 240 is specifically configured for: matching a corner point with an upper-left category and a corner point with an upper-right category closest to each other to obtain an upper corner point pair; matching a corner point with a lower-left category and a corner point with a lower-right category closest to each other to obtain a lower corner point pair; and matching the upper corner point pair and the lower corner point pair closest to each other to obtain a corner point group.

The corner point group determination module 240 is specifically configured for: matching a corner point with an upper-left category and a corner point with a lower-left category which are closest to each other to obtain a left corner point pair; matching a corner point with an upper-right category and a corner point with a lower-right category which are closest to each other to obtain a right corner point pair; and matching the left corner point pair and the right corner point pair which are closest to each other to obtain a corner point group.

Optionally, the apparatus 200 for detecting corner points of lane lines further comprises a corner point group removal module (not shown in FIG. 4) configured for removing abnormal corner point groups from the plurality of corner point groups. Optionally, the corner point group removal module is specifically configured for removing the corner point groups with a difference between edge length of two corner point pairs greater than a predetermined threshold value from the plurality of the corner point groups, and further configured for removing the corner point groups without the lane line in the semantic segmentation result corresponding to an area where diagonal lines are located from the plurality of the corner point groups having the four corner points.

The apparatus 200 for detecting corner points of lane lines further comprises a training module (not shown in FIG. 4) configured for: acquiring a plurality of training images containing dashed lane lines, wherein the training images are annotated with corner points of the dashed lane lines and a probability of each pixel near the corner points belonging to a specific corner point category; and training an initial neural network model by using the training image to obtain the trained neural network model. Optionally, the probability of each pixel near the corner point belonging to a specific corner point category presents a Gaussian distribution, and each corner point group constitutes one example of lane lines.

The implementation principle and the generated technical effects of the apparatus 200 for detecting corner points of lane lines provided in an embodiment of the present application are the same as those of the aforementioned method embodiments, and for a brief description, what is not mentioned in apparatus embodiments can be referred to the corresponding contents in the aforementioned method embodiments.

Figure 5:
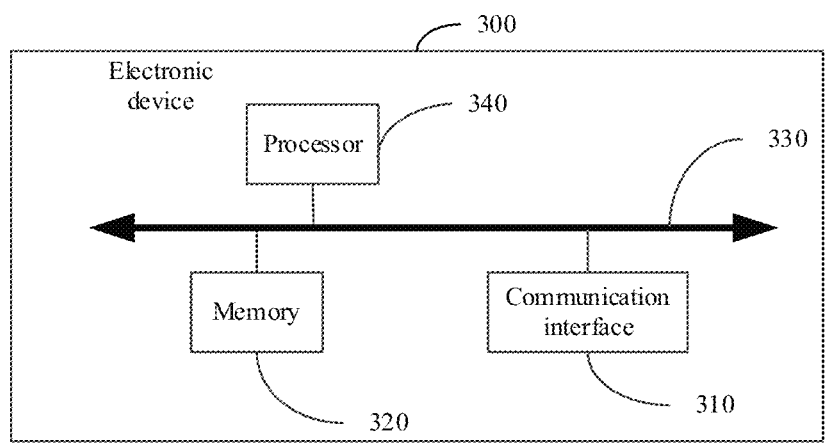
FIG. 5 is a schematic diagram of a structure of an electronic device provided in an embodiment of the present application.

As shown in FIG. 5, FIG. 5 is a block diagram illustrating a structure of an electronic device 300 provided in an embodiment of the present application. The electronic device 300 comprises a communication interface 310, a memory 320, a communication bus 330, and a processor 340.

The communication interface 310, the memory 320, and the processor 340 are electrically connected to each other directly or indirectly to achieve data transmission or interaction. For example, these elements can be electrically connected to each other via one or more communication buses 330 or signal lines. The communication interface 310 is configured for implementing one or more communication protocols (LTE, Wi-Fi, etc.). The memory 320 is configured for storing computer programs, e.g., a software functional module shown in FIG. 4, that is, the apparatus 200 for detecting corner points of lane lines. Wherein, the apparatus 200 for detecting corner points of lane lines comprises at least one software functional module that can be stored in the memory 320 in a form of a software or a firmware or can be cured in an operating system (OS) of the electronic device 300. The processor 340 is configured for implementing an implementable module stored in the memory 320, e.g., software functional modules and computer programs comprised in the apparatus 200 for detecting corner points of lane lines. For example, the processor 340 is configured for: obtaining a road image to be detected; inputting the road image into a pre-trained neural network model for processing to obtain a heat map prediction result corresponding to the road image, wherein the heat map prediction result comprises a probability of each pixel belonging to a specific corner point category; determining a plurality of different categories of corner points in the road image according to the probability of each pixel belonging to a specific corner point category in the heat map prediction result; and grouping the plurality of different categories of corner points according to a predetermined rule to obtain a plurality of corner point groups.

Wherein, the memory 320 can be, but is not limited to, a Random Access Memory (RAM), a Read Only Memory (ROM), a Programmable Read-Only Memory (PROM), an Erasable Programmable Read-Only Memory (EPROM), an Electric Erasable Programmable Read-Only Memory (EEPROM), and the like.

The processor 340 can be an integrated circuit chip having a signal processing capability. The above-mentioned processor can be a general-purpose processor comprising a Central Processing Unit (CPU), a Network Processor (NP), and the like, or can be a Digital Signal Processor (DSP), an Application Specific Integrated Circuit (ASIC), a Field Programmable Gate Array (FPGA) or other programmable logic devices, discrete gates or transistor logic elements and discrete hardware components. The various methods, steps and logic block diagrams disclosed in embodiments of the present application can be implemented or performed. The general-purpose processor can be a microprocessor or the processor 340 can be any conventional processor or the like.

Wherein, the above-mentioned electronic device 300 includes, but is not limited to, a computer, a server, and an on-board computer in a vehicle and the like.

An embodiment of the present application further provides a non-volatile computer readable storage medium (hereinafter referred to as a storage medium), wherein the storage medium has a computer program stored thereon, and the computer program performs the above-mentioned the method for detecting corner points of lane lines when executed by a computer such as the above-mentioned electronic device 300.

It should be noted that, all embodiments of the present application are described in a progressive manner. Each embodiment is highlighted in differences from other embodiments, and the same and similar parts among the embodiments can be referred to each other.

In the several embodiments provided in the present application, it should be understood that the disclosed device and method can also be implemented in other manners. The apparatus embodiments described above are merely illustrative, for example, flowcharts and block diagrams in the drawings show systematic architectures, functions, and operations of the apparatus, the method and the computer program product possibly implemented according to a plurality of embodiments of the present application. In this regard, each block in the flowcharts or the block diagrams can represent a portion of a module, a program segment or codes, wherein the portion of the module, the program segment or the codes comprises one or more executable instructions for implementing specified logical functions. It should also be noted that, in some alternative implementations, the functions annotated in the block can also occur in a different order from those annotated in the drawings. For example, actually, two consecutive blocks can substantially be implemented in parallel, and the two blocks can sometimes be implemented in an opposite order, which depend upon the involved functions. It should also be noted that each block of the block diagrams and/or the flowcharts, and a combination of the blocks in the block diagrams and/or the flowcharts can be implemented through a dedicated hardware-based system that performs a specified function or operation, or can be implemented through a combination of a dedicated hardware and a computer instruction.

In addition, the functional modules in the embodiments of the present application can be integrated together to form an independent part, or each module can exist independently, or two or more modules can be integrated to form an independent part.

The present application, if implemented in a form of a software functional module and sold or used as an independent product, can be stored in a computer readable storage medium. Based on such understanding, the technical schemes of the present application substantially or parts contributing to the prior art or parts of the technical schemes can be embodied in a form of a software product. The computer software product is stored in a storage medium and comprises several instructions for enabling a computer device (which can be a personal computer, a notebook computer, a server, or an electronic device, etc.) to implement all or part of steps of the method in the embodiments of the present application. And the aforementioned storage medium comprises a U-disk, a removable hard disk, a Read-Only Memory (ROM), a Random Access Memory (RAM), a magnetic disk, an optical disk, or other various mediums capable of storing program codes.

The above-mentioned is only specific embodiments of the present application, but the protection scope of the present application is not limited thereto, and any person skilled in the art can easily recognize that changes or substitutions within the technical scope of the present application shall be encompassed within the protection scope of the present application. Therefore, the protection scope of the present application shall be subject to the protection scope of the claims.

What is claimed is:

1. A method for detecting corner points of a lane line, comprising:
   obtaining a road image to be detected;
   inputting the road image into a pre-trained neural network model to obtain a heat map prediction result corresponding to the road image, wherein the heat map prediction result comprises a probability that each pixel of the road image belongs to a specific corner point category;
   determining a plurality of different categories of corner points in the road image according to the heat map prediction result; and
   grouping the plurality of different categories of corner points according to a predetermined rule to obtain at least one corner point group.

2. The method according to claim 1, wherein the neural network model comprises a first network branch and a second network branch, wherein the first network branch is configured for outputting a semantic segmentation result indicating whether the pixel in the road image belonging to the lane line or not, and the second network branch is configured for outputting a heat map prediction result of the road image.

3. The method according to claim 2, wherein,
   a prediction value of each pixel in the semantic segmentation result is 0 or 1, or the prediction value of each pixel in the semantic segmentation result is a probability value in a [0,1] interval; and
   a prediction value of each pixel in the heat map prediction result is a probability value in the [0,1] interval.

4. The method according to claim 2, further comprising:
   multiplying the heat map prediction result by a prediction value of each pixel in the semantic segmentation result to remove points of an area without the lane line in the heat map, thereby obtaining an updated heat map.

5. The method according to claim 4, wherein the multiplying the heat map prediction result by a prediction value of each pixel in the semantic segmentation result comprises:
   expanding a pixel region characterizing the lane line in the semantic segmentation result to obtain an updated semantic segmentation result; and
   multiplying the heat map prediction result by a prediction value of each pixel in the updated semantic segmentation result.

6. The method according to claim 1, wherein the heat map prediction result comprises four heat maps, each heat map corresponding to a corner point category and comprising a probability of each pixel belonging to the corresponding corner point category in the heat map.

7. The method according to claim 6, wherein the determining a plurality of different categories of corner points in the road image according to the heat map prediction result comprises:
   determining corresponding corner point category of each corner point of each heat map according to the probability of each pixel belonging to a specific corner point category in the heat map; and
   obtaining four corner point categories of corner points contained in the four heat maps.

8. The method of claim 7, wherein the determining corresponding corner point category of each corner point of each heat map according to the probability of each pixel belonging to a specific corner point category in the heat map comprises:
   adopting a preset sliding window area to perform a sliding window operation in the heat map; and
   annotating a central point of the sliding window area as a corner point belonging to a corresponding corner point category of corner point if the probability value of the central point of the sliding window area meets a predetermined condition.

9. The method according to claim 8, wherein the predetermined condition comprises:
   the probability value of the central point of the sliding window area is greater than or equal to a preset probability threshold value and is a local maximum value of the sliding window area.

10. The method according to claim 1, wherein the corner point categories comprise at least one of an upper-left category, an upper-right category, a lower-left category, and a lower-right category.

11. The method according to claim 10, wherein the grouping the plurality of different categories of corner points according to a predetermined rule to obtain at least one corner point group comprises:
    matching a corner point with an upper-left category and a corner point with an upper-right category which are closest to each other to obtain an upper corner point pair;
    matching a corner point with a lower-left category and a corner point with a lower-right category which are closest to each other to obtain a lower corner point pair; and
    matching the upper corner point pair and the lower corner point pair closest to each other to obtain a corner point group.

12. The method according to claim 10, wherein the grouping the plurality of different categories of corner points according to a predetermined rule to obtain at least one corner point group comprises:
    matching a corner point with an upper-left category and a corner point with a lower-left category which are closest to each other to obtain a left corner point pair;
    matching a corner point with an upper-right category and a corner point with a lower-right category which are closest to each other to obtain a right corner point pair; and
    matching the left corner point pair and the right corner point pair that are closest to each other to obtain a corner point group.

13. The method according to claim 1, wherein the at least one corner point group comprises a plurality of corner point groups, and the method further comprises:
    removing abnormal corner point groups from the plurality of the corner point groups.

14. The method according to claim 13, wherein the removing abnormal corner point groups from the plurality of the corner point groups comprises:
    removing, from the plurality of the corner point groups, the corner point groups with a difference between edge lengths of two corner point pairs being greater than a predetermined threshold value.

15. The method according to claim 1, further comprising:
    obtaining a plurality of training images containing dashed lane lines, wherein the training images are annotated with corner points of the dashed lane lines and a probability of each pixel near the corner points belonging to a specific corner point category; and
    training an initial neural network model by using the training image to obtain the trained neural network model.

16. The method according to claim 15, wherein the annotated probability of each pixel near the corner point belonging to a specific corner point category presents a Gaussian distribution, and each corner point group constitutes one example of a lane line.

17. An electronic device, comprising:
a memory and a processor, wherein the processor is connected with the memory;
the memory is configured for storing programs; and
the processor is configured for calling the programs stored in the memory to perform a method comprising:
obtaining a road image to be detected;
inputting the road image into a pre-trained neural network model to obtain a heat map prediction result corresponding to the road image, wherein the heat map prediction result comprises a probability that each pixel belongs to a specific corner point category;
determining a plurality of different categories of corner points in the road image according to the heat map prediction result; and
grouping the plurality of different categories of corner points according to a predetermined rule to obtain at least one corner point group.

18. A non-transitory storage medium, having a computer program stored thereon, wherein the computer program, when executed by a processor, performs a method comprising:
obtaining a road image to be detected;
inputting the road image into a pre-trained neural network model to obtain a heat map prediction result corresponding to the road image, wherein the heat map prediction result comprises a probability that each pixel belongs to a specific corner point category;
determining a plurality of different categories of corner points in the road image according to the heat map prediction result; and
grouping the plurality of different categories of corner points according to a predetermined rule to obtain at least one corner point group.

19. The non-transitory storage medium according to claim 18, wherein the neural network model comprises a first network branch and a second network branch, wherein the first network branch is configured for outputting a semantic segmentation result indicating whether the pixel in the road image belonging to the lane line or not, and the second network branch is configured for outputting a heat map prediction result of the road image.

20. The non-transitory storage medium according to claim 19, the method further comprising:
multiplying the heat map prediction result by a prediction value of each pixel in the semantic segmentation result to remove points of an area without the lane line in the heat map, thereby obtaining an updated heat map.

* * * * *